(12) United States Patent
Mochizuki et al.

(10) Patent No.: US 8,008,368 B2
(45) Date of Patent: Aug. 30, 2011

(54) OIL-BASED INK COMPOSITION FOR INKJET RECORDING

(75) Inventors: Seiji Mochizuki, Nagano-Ken (JP); Makoto Otsuki, Nagano-Ken (JP); Masahiro Nakamura, Nagano-Ken (JP); Yukio Sugita, Kanagawa-Ken (JP); Mitsuyoshi Tamura, Kanagawa-Ken (JP); Fumie Yamazaki, Kanagawa-Ken (JP); Tamayo Okahira, Kanagawa-Ken (JP)

(73) Assignees: Seiko Epson Corporation (JP); The Inctec Inc. (JP)

( * ) Notice: Subject to any disclaimer, the term of this patent is extended or adjusted under 35 U.S.C. 154(b) by 168 days.

(21) Appl. No.: 11/644,030

(22) Filed: Dec. 21, 2006

(65) Prior Publication Data

US 2007/0167538 A1    Jul. 19, 2007

(30) Foreign Application Priority Data

Dec. 22, 2005 (JP) ................. 2005-369799

(51) Int. Cl.
*C09D 11/00* (2006.01)
*C08F 8/06* (2006.01)

(52) U.S. Cl. .............. 523/160; 428/32.1; 525/326.1; 525/330.3; 525/329.7; 525/383; 525/385; 526/78; 526/82; 526/84; 526/89; 526/209; 526/317.1; 526/318; 526/319; 526/320; 106/493

(58) Field of Classification Search ........... 525/385; 523/160; 524/366, 556
See application file for complete search history.

(56) References Cited

U.S. PATENT DOCUMENTS

| 4,529,787 | A | * | 7/1985 | Schmidt et al. | 526/209 |
|---|---|---|---|---|---|
| 5,567,761 | A | * | 10/1996 | Song | 524/523 |
| 5,708,086 | A | * | 1/1998 | DePue et al. | 525/123 |
| 5,942,369 | A | * | 8/1999 | Ota et al. | 430/192 |
| 2002/0128351 | A1 | * | 9/2002 | Kiguchi et al. | 523/161 |
| 2004/0094067 | A1 | * | 5/2004 | Oyanagi et al. | 106/31.58 |
| 2004/0249018 | A1 | * | 12/2004 | Kataoka et al. | 523/160 |
| 2004/0266907 | A1 | * | 12/2004 | Sugita et al. | 523/160 |

* cited by examiner

*Primary Examiner* — Vasu Jagannathan
*Assistant Examiner* — Robert C Boyle
(74) *Attorney, Agent, or Firm* — Harness, Dickey & Pierce, P.L.C.

(57) ABSTRACT

An oil-based ink composition for inkjet recording capable of exhibiting desired properties of drying after print, rubfastness and re-solubility is achieved by performing solubilization on an acrylic resin which is not easily dissolved conventionally. The oil-based ink composition for inkjet printing comprises glycol ether dialkyl ethers as a prime solvent; and an acrylic resin that results from solution polymerization in a solvent of the glycol ether dialkyl ethers by use of a radical polymerization initiator.

14 Claims, 1 Drawing Sheet

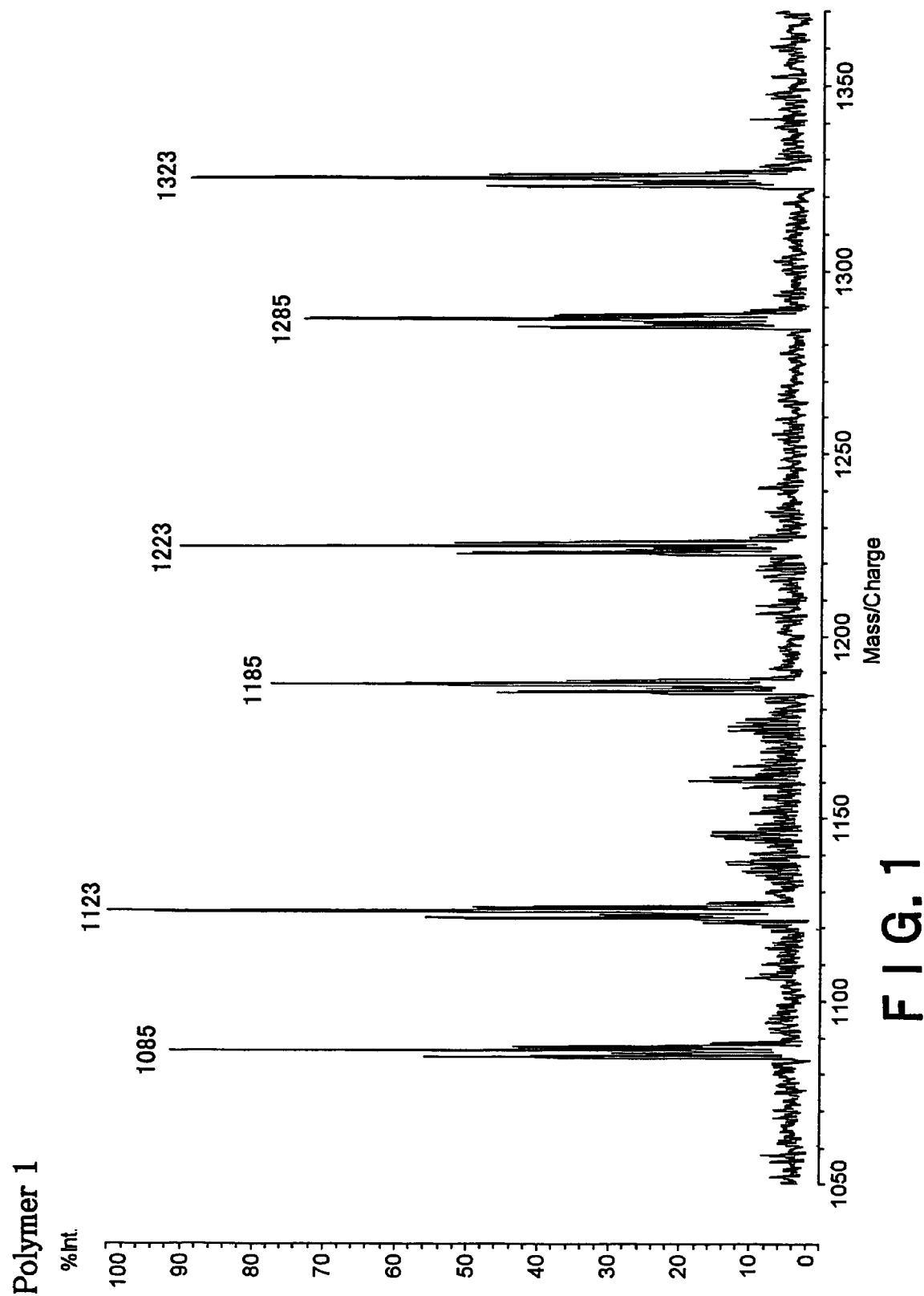

OIL-BASED INK COMPOSITION FOR INKJET RECORDING

TECHNICAL FIELD

This invention relates to an oil-based ink composition for inkjet recording.

BACKGROUND ART

There are various inkjet recording methods such as a method of using electrostatic attraction to eject ink (electric-field control method), a method of using pressure generated by driving a piezoelectric element to eject ink (drop-on-demand method or pressure pulse method), a method of using pressure generated by generating and growing bubbles at high temperature (bubble or thermal jet method), and the like. These methods are known to provide a highly accurate image.

The types of ink typically used in these inkjet recording methods include a water-based ink produced by use of water as a prime solvent and an oil-based ink produced by use of oil as a prime solvent. The image printed by use of the water-based ink is of inferior waterproof properties and the water-based ink is not suitable for printing on a record medium having a waterproof surface. In contrast, the oil-based ink has advantages such as that of providing a printed image with high waterproof properties and of facilitating the printing on a record medium having a waterproof surface and on a sheet of woodfree paper. In particular, an oil-based ink including pigment as a colorant also has high lightfastness properties.

However, the conventional oil-based ink includes, typically, as an organic solvent, aromatic hydrocarbons such as toluene and xylene, aliphatic hydrocarbons such as hexane and coal oil, ketones such as methyl ethyl ketone, esters such as acetic ester, or low-boiling solvent such as propylene glycol monomethyl ether acetate. The printing process using ink including such an organic solvent involves problems with easy clogging of a nozzle because the organic solvent has a low boiling point and a low flashpoint and dries at excessively high speeds.

In addition, there is another problem with an increase of the cost required for meeting printer specifications for the reasons of solubility and the bloating tendency with respect to the plastic (e.g., a polystyrene resin, an ABS resin or the like) used for an ink container and units or components in a printer or the like. Further, printing on a polyvinyl chloride base material is dissatisfactory in the quality of printing and the drying properties after printing.

It can be said that a solvent of glycol ether dialkyl ethers is superior to a low boiling-point solvent generally used as a solvent for ink compositions, since the solvent of glycol ether dialkyl ethers has high safety because of a high boiling point, a low vapor pressure and a low odor and is outstanding at the working atmosphere. However, the solvent of glycol ether dialkyl ethers has a lower resin solubility as compared with the conventionally used solvent with a low boiling point. For this reason, when a commercially available solid resin is melted and used, the number of usable resins is limited. As a result, the use of a resin having a high glass transition temperature (Tg) such as methyl methacrylate homopolymer is difficult. The use of such an acrylic resin involves the problems in the stabilities of the storage and ejection of ink.

Alternatively, acrylic monomers having the effect of increasing the solubility are used to cause a reduction in Tg or a reduction in molecular weight in order to produce an acrylic resin with an improved solubility. The use of this acrylic resin involves the difficulties in sufficiently providing the drying properties after printing and the rubfastness.

DISCLOSURE OF THE INVENTION

The present invention provides an oil-based ink composition for inkjet recording which is capable of exhibiting desired properties of drying after printing, rubfastness and re-solubility by use of glycol ether dialkyl ethers as a prime solvent and an acrylic resin subjected to solubilization which is not easily dissolved conventionally in the solvent.

The present invention has been made for resolving this problem.

Accordingly, an oil-based ink composition for inkjet recording according to the present invention comprises glycol ether dialkyl ethers (ingredient a) as a prime solvent and an acrylic resin (ingredient b) that results from solution polymerization in a solvent of the glycol ether dialkyl ethers by use of a radical polymerization initiator.

In a preferable form of the oil-based ink composition for inkjet recording according to the present invention, the glycol ether dialkyl ethers (ingredient a) is one kind selected from the group consisting of either polyoxyethylene glycol dimethyl ether, polyoxyethylene glycol diethyl ether, and polyoxyethylene glycol ethyl methyl ether, expressed by a general formula (1) described below, $$R^1\text{—}(OC_2H_4)_n\text{—}OR^2 \qquad (1)$$

where $R^1$ and $R^2$ denote independently a methyl group or ethyl group and n denotes an integral number from 2 to 4.

In a preferable form of the oil-based ink composition for inkjet recording according to the present invention, a reaction product having structure in which a solvent molecule is bonded to a terminal of the acrylic resin is present in the oil-based ink composition.

In a preferable form of the oil-based ink composition for inkjet recording according to the present invention, the acrylic resin (ingredient b) is obtained from a free radical polymerizable monomer selected from the group consisting of a vinyl aromatic compound, alkyl methacrylate ester, aralkyl methacrylate ester, alkoxyalkyl methacrylate ester, hydroxyalkyl methacrylate ester, methacrylic acid, and dialkylaminoalkyl methacrylate ester.

In a preferable form of the oil-based ink composition for inkjet recording according to the present invention, the acrylic resin (ingredient b) is either a polymer of methacrylate methyl ester or a copolymer comprising 100 part by weight of methacrylate methyl ester and 0.01 to 15 part by weight of one selected from the group consisting of methacrylate butyl ester, methacrylate ethoxyethyl ester and methacrylate benzyl ester.

In a preferable form of the oil-based ink composition for inkjet recording according to the present invention, the acrylic resin (ingredient b) has a glass transition temperature of 80° C. or more.

In a preferable form of the oil-based ink composition for inkjet recording according to the present invention, the acrylic resin (ingredient b) has a weight average molecular weight of 10,000 to 100,000.

In a preferable form of the oil-based ink composition for inkjet recording according to the present invention, the oil-based ink composition further comprises a colorant (ingredient c).

In a preferable form of the oil-based ink composition for inkjet recording according to the present invention, the oil-based ink composition further comprises a resin ingredient of at least one kind of vinyl chloride copolymer resins and cellulose resins (ingredient d).

In a preferable form of the oil-based ink composition for inkjet recording according to the present invention, the oil-based ink composition further comprises lactones (ingredient e).

In a preferable form of the oil-based ink composition for inkjet recording according to the present invention, the oil-based ink composition further comprises a dispersant (ingredient f).

In a preferable form of the oil-based ink composition for inkjet recording according to the present invention, the radical polymerization initiator comprises one or more kinds selected from the groups consisting of organic peroxides of a hydroperoxide type, a dialkylperoxide type, a peroxyester type, a diacylperoxide type, a peroxycarbonate type, a peroxyketal type and a ketoneperoxide type.

A method of producing an oil-based ink composition for inkjet recording according to the present invention comprises a step of blending glycol ether dialkyl ethers (ingredient a) and an acrylic resin (ingredient b) that results from solution polymerization in a solvent of the glycol ether dialkyl ethers by use of a radical polymerization initiator, together.

The oil-based ink composition for inkjet according to the present invention is suitable for printing on a polyvinyl chloride base material and has the outstanding properties such as coloring properties, print stability, drying properties after print, rubfastness and re-solubility.

BRIEF DESCRIPTION OF DRAWINGS

FIG. 1 is a graph showing the data obtained from the measurements of polymer 1 obtained in an example by a laser ionization time-of-flight mass spectrometer.

BEST MODE FOR CARRYING OUT THE INVENTION

Next, the present invention will be described in detail with reference to the best mode for carrying out the invention.
<Glycol Ether Dialkyl Ethers (Ingredient a)>

Preferable examples of glycol ether dialkyl ethers (ingredient a) in the oil-based ink composition for inkjet recording according to the present invention include polyoxyethylene glycol dimethyl ether, polyoxyethylene glycol diethyl ether, and polyoxyethylene glycol ethyl methyl ether, expressed by the general formula described below,

$$R^1-(OC_2H_4)_n-OR^2 \quad (1)$$

where $R^1$ and $R^2$ denote independently a methyl group or ethyl group and n denotes an integral number from 2 to 4.

These glycol ether dialkyl ethers may be used either alone or in combination of two kinds or more. The glycol ether dialkyl ether has a high boiling point and a low vapor pressure, which is thus good for the working atmosphere.

The oil-based ink composition for inkjet recording according to the present invention comprises, as the prime solvent, 5 to 100 wt %, preferably, 10 to 100 wt % of the above-described ingredient a when the total amount of the solvent in the oil-based ink composition is 100 wt %.
<Acrylic Resin (Ingredient b)>

An acrylic resin (ingredient b) in the oil-based ink composition for inkjet recording according to the present invention results specifically from solution polymerization in the solvent of the glycol ether dialkyl ethers by use of a radical polymerization initiator. The acrylic resin (ingredient b) of the present invention has good compatibility with the ingredient a, so that a solution comprising the ingredient a and the ingredient b is able to be easily prepared.

The use of the acrylic resin (ingredient b) facilitates the preparation of the solution, thus providing an oil-based ink composition for inkjet recording which is suitable for printing on a polyvinyl chloride base material.

Such an ingredient b can be obtained from a free radical polymerizable monomer preferably selected from the group consisting of a vinyl aromatic compound, alkyl methacrylate ester, aralkyl methacrylate ester, alkoxyalkyl methacrylate ester, hydroxyalkyl methacrylate ester, methacrylic acid, and dialkylaminoalkyl methacrylate ester. The ingredient b as described above is capable of providing an oil-based ink composition for inkjet recording having outstanding properties in color development, print stability, print drying, rubfastness, and re-solubility.

Various monomers may be used as the free radical polymerizable monomer of the present invention if they have at least one radical polymerizable ethylene double bond in a molecule and are polymerizable in the co-presence of a radical polymerization initiator in a solvent as described later.

Examples of the free radical polymerizable monomer comprise:

(A) styrene;

(B) α-alkyl styrene, o-alkyl styrene, m-alkyl styrene, p-alkyl styrene, nitro, cyano, amido, ester derivative;

(C) (meth)acrylate esters such as (meth)acrylic acid, methyl (meth)acrylate, ethyl (meth)acrylate, n-propyl (meth)acrylate, iso-propyl (meth)acrylate, n-butyl (meth)acrylate, sec-butyl (meth)acrylate, iso-butyl (meth)acrylate, tert-butyl (meth)acrylate, pentyl (meth)acrylate, neopentyl (meth)acrylate, hexyl (meth)acrylate, 2-ethylhexyl (meth)acrylate, octyl (meth)acrylate, iso-octyl (meth)acrylate, nonyl (meth)acrylate, iso-nonyl (meth)acrylate, dodecyl (meth)acrylate, tridecyl (meth)acrylate, stearyl (meth)acrylate, cyclopentyl (meth)acrylate, cyclohexyl (meth)acrylate, 2-methylcyclohexyl (meth)acrylate, dicyclopentanyl (meth)acrylate, dicyclopentenyloxyethyl (meth)acrylate, dicyclohexyl (meth)acrylate, isobornyl (meth)acrylate, adamantly (meth)acrylate, allyl (meth)acrylate, propargyl (meth)acrylate, phenyl (meth)acrylate, naphthyl (meth)acrylate, anthracenyl (meth)acrylate, anthraninonyl (meth)acrylate, piperonyl (meth)acrylate, salicyl (meth)acrylate, furyl (meth)acrylate, furfuryl (meth)acrylate, tetrahydrofuryl (meth)acrylate, tetrahydrofurfuryl (meth)acrylate, pyranyl (meth)acrylate, benzyl (meth)acrylate, phenethyl (meth)acrylate, cresyl (meth)acrylate, glycidyl (meth)acrylate, 4-hydroxybutyl (meth)acrylate glycidyl ether, 3,4-epoxycyclohexylmethyl (meth)acrylate, 3,4-epoxycyclohexylethyl (meth)acrylate, 1,1,1-trifluoroethyl (meth)acrylate, perfluoroethyl (meth)acrylate, perfluoro-n-propyl (meth)acrylate, perfluoro-iso-propyl (meth)acrylate, heptadecafluorodecyl (meth)acrylate, triphenylmethyl (meth)acrylate, cumyl (meth)acrylate, 3-(N,N-dimethylamino)propyl (meth)acrylate, 2-hydroxyethyl (meth)acrylate, 2-hydroxyproyl (meth)acrylate, 2,3-dihydroxypropyl (meth)acrylate, 4-hydroxybutyl (meth)acrylate, methoxyethyl (meth)acrylate, ethoxyethyl (meth)acrylate, butoxyethyl (meth)acrylate, 2-cyanoethyl (meth)acrylate, dimethylaminoethyl (meth)acrylate, diethylaminoethyl (meth)acrylate, trimethoxysilylpropyl (meth)acrylate, triethoxysilylpropyl (meth)acrylate, 3-methacryloxypropyl methyldiethoxysilane, 3-methacryloxypropyl methyldiemethoxysilane;

(D) (meth)acrylamide such as (meth)acrylamide, N,N-dimethyl(meth)acrylamide, N,N-diethyl(meth)acrylamide, N,N-dipropyl(meth)acrylamide, N,N-di-iso-propyl(meth)acrylamide, butyl(meth)acrylamide, stearyl(meth)acrylamide, cyclohexyl(meth)acrylamide, phenyl(meth)acrylamide, benzyl(meth)acrylamide, anthracenyl(meth)acrylamide;

(E) vinyl compounds such as (meth)acrylanilid, (meth)acryloyinitrile, acrolein, vinyl chloride, vinylidene chloride, vinyl fluoride, vinylidene fluoride, N-vinylpyrrolidone, vinylpyridine, N-vinylcarbazole, vinylimidazole, vinyl acetate;

(F) monomaleimide such as N-benzylmaleimide, N-phenylmaleimide, N-cyclohexylmaleimide, N-lauricmaleimide, N-(4-hydoxyphenyl)maleimide; and (G) phthalimide such as N-(meth)acryloylphthalimide. "(Meth)acrylate" and "(meth)acryl" used here means "acrylate and/or methacrylate" and "acryl and/or methacryl".

Some of the above monomers are available from Mitsubishi Rayon Co., Ltd, NOF Corporation, Mitsubishi Chemical Corporation, Hitachi Chemical Co., Ltd, and the like.

The present invention may use each kind alone of the free radical polymerizable monomers described above by way of example, or alternatively a combination of two or more kinds of the free radial polymerizable monomers. The free radical polymerizable monomer may be also used along with another copolymerizable monomer as necessary. In consequence, the polymer composition produced by the present invention comprises a single polymer and a copolymer of the foregoing free radical polymerizable monomers, and a copolymer of another monomer and the free radical polymerizable monomers.

A particular preferable copolymer comprises 100 part by weight of methacrylate methyl ester and 0.01 to 15 part by weight, preferably, 0.1 to 15 part by weight, more preferably, 0.5 to 12 part by weight of methacrylate butyl ester, methacrylate ethoxyethyl ester or methacrylate benzyl ester. Such a copolymer is capable of providing specially an oil-based ink composition for inkjet recording having satisfactory physical properties of a printed article.

The molecular weight and the glass transition temperature (Tg) of the acrylic resin (ingredient b) are selectively determined. However, in the present invention, the weight average molecular weight is preferably 500 to 150,000, more preferably 10,000 to 100,000, and the glass transition temperature (Tg) is preferably 60° C. or more, more preferably 80° C. or more. If the weight average molecular weight and Tg are within the above ranges, the effects of providing the re-solubility and the satisfactory physical properties of a printed article are remarkably exerted.

<Radical Polymerization Initiator>

Desirable radical polymerization initiators used in the present invention are organic peroxides of a hydroperoxide type, a dialkylperoxide type, a peroxyester type, a diacylperoxide type, a peroxycarbonate type, a peroxyketal type or a ketoneperoxisde type, specific examples of which comprise compounds as described below. In the following, more preferable compounds in the present invention are marked with asterisk superscripts (*).

(A) Hydroperoxides: e.g., t-butyl hydroperoxide*, 1,1,3,3-tetramethylbutyl hydroperoxide*, p-menthane hydroperoxide, cumene hydroperoxide*, diisopropylbenzene hydroperoxide, and the like.

(B) Dialkylperoxides: e.g., di-t-butyl peroxide*, di-t-hexyl peroxide*, t-butylcumyl peroxide, dicumyl peroxide, 2,5-dimethyl-2,5-di(t-butylperoxy)hexane, 2,5-dimethyl-2,5-di(t-butylperoxy)hexyne-3, di(2-t-butylperoxyisopropyl)benzene, and the like.

(C) Peroxyesters: e.g., 1,1,3,3-tetramethylbutyl peroxyneodecanoate*, α-cumyl peroxyneodecanoate*, t-butyl peroxyneodecanoate*, t-hexyl peroxyneodecanoate*, 1-cyclohexyl-1-methylethyl peroxyneodecanoate*, t-butyl peroxyneoheptanoate, t-hexyl peroxypivalate*, t-butyl peroxypivalate*, 1,1,3,3-tetramethylbutyl peroxy-2-ethyl hexanoate*, t-amyl peroxy-2-ethylhexanoate, t-butyl peroxy-2-ethylhexanoate*, t-hexyl peroxy-2-ethyl hexanoate*, t-butyl peroxy-2-ethylhexyl monocarbonate*, t-amyl peroxy-3,5,5-trimethylhexanoate, t-butyl peroxy-3,5,5-trimethylhexanoate*, t-butyl peroxyacetate*, t-butyl peroxyisobutyrate*, t-butyl peroxybenzoate*, t-butyl peroxy-3-methylbenzoate*, t-hexyl peroxybenzoate*, di-t-butyl peroxytrimethyladipate, di-t-butyl peroxyhexahydroterephthalate, t-butyl peroxymaleic acid, t-butyl peroxylaurate*, t-butyl peroxyisopropylmonocarbonate*, t-hexyl peroxyisopropylmonocarbonate*, 2,5-dimethyl-2,5-di(2-ethylhexanoylperoxy)hexane*, 2,5-dimethyl-2,5-di(3-methylbenzoylperoxy)hexane*, 2,5-dimethyl-2,5-di(benzoylperoxy)hexane*, and the like.

(D) Diacylperoxides: e.g., diisobutyryl peroxide, di(3,5,5-trimethylhexanoyl) peroxide*, dilauroyl peroxide*, dibenzoyl peroxide*, di-n-octanoyl peroxide, distearoyl peroxide*, disuccinic acid peroxide*, di(4-methylbenzoyl) peroxide, and the like.

(E) Peroxycarbonates: e.g., di(2-ethoxyethyl) peroxydicarbonate, di-n-propyl peroxydicarbonate, diisopropyl peroxydicarbonate, t-butyl peroxyisopropylcarbonate, 1,6-bis(t-butylperoxycarbonyloxy)hexane, di(3-methoxybutyl) peroxydicarbonate, di-sec-butyl peroxydicarbonate, t-butyl peroxy-2-ethylhexylcarbonate, di(2-ethylhexyl) peroxydicarbonate, di-1-methylheptyl peroxydicarbonate, di(4-t-butylcyclohexyl) peroxydicarbonate*, and the like.

(F) Peroxyketals: e.g.,
2,2-di(4,4-di-t-butyl peroxycyclohexyl)propane,
2,2-di(t-butylperoxy) butane*,
1,1-di(t-butylperoxy)cyclohexane*,
1,1-di(t-butylperoxy)-2-methylcyclohexane*,
1,1-di(t-butylperoxy)-3,3,5-trimethylcyclohexane,
1,1-di(t-hexylperoxy)cyclohexane*,
1,1-di(t-hexylperoxy)-3,3,5-trimethylcyclohexane*, n-butyl-4,4-di(t-butylperoxy) valerate*, and the like.

(G) Ketoneperoxides: e.g., acetylacetone peroxide, cyclohexanone peroxide, methylcyclohexanone peroxide, and the like.

Among them, the dialkyl peroxide type organic peroxides, the peroxyester type organic peroxides, and the diacyl peroxide type organic peroxides are preferable.

These radical polymerization initiators may be used either alone or in combination of two kinds or more.

<Other Ingredients>

In addition to the foregoing essential ingredients a and b, the oil-based ink composition for inkjet recording according to the present invention may comprise other ingredients as necessary. Examples of the other ingredients which are addable as needed comprise a colorant (ingredient c), a resin ingredient of at least one kind of vinyl chloride copolymer resins and cellulose resins (ingredient d), lactones (ingredient e) and a dispersant (ingredient f).

For the colorant (ingredient c), dyes, pigments such as an inorganic pigment or an organic pigment generally used in the conventional oil-based ink compositions may be used either alone or as a mixture. Specific examples of the pigments comprise carbon black, cadmium red, molybdenum red, chromium yellow, cadmium yellow, titanium yellow, chromium oxide, viridian, titanium cobalt green, ultramarine blue, Prussian blue, cobalt blue, diketopyrrolopyrrole, anthraquinone, benzimidazolone, anthrapyrimidine, azo pigments, phthalocyanine pigments, quinacridone pigments, isoindolinone pigments, dioxazine pigments, threne pigments, perylene pigments, perinone pigments, thioindigo pigments, quinophthalone pigments, metal complex pigments and the like. Specific examples of the dyes include azo dyes, metal complex salt dyes, naphtholic dyes, anthraquinone dyes, indigo dyes, carbonium dyes, quinoimine dyes, xanthine dyes, cyanine dyes, quinoline dyes, nitro dyes, nitroso dyes, benzoquinone dyes, naphthoquinone dyes, phthalocyanine dyes and metal phthalocyanine dyes. In particular, the oil soluble dye is preferable. These pigments and/or dyes may be used either alone or in a combination of two or more kinds of them, but the use of pigments is preferable in terms of weather-fastness.

Regarding a resin ingredient of at least one kind of vinyl chloride copolymer resins and cellulose resins (ingredient d), for example, a styrene acrylic resin, a vinyl chloride-vinyl acetate copolymer resin, a cellulose resin such as cellulose acetate butyrate, a vinyltoluene-α-methylstyrene copolymer resin, and the like may be used either alone or as a mixture. The use of ingredient d enables the viscosity adjustment to the oil-based ink composition and a further improvement in the adhesion to the vinyl chloride base material which is a recode medium.

Examples of the lactones (ingredient e) comprise γ-lactones having five-membered ring structure, δ-lactones having six-membered ring structure and ε-lactones having seven-membered ring structure. For example, γ-butyrolactone, γ-valerolactone, γ-hexalactone, γ-heptalactone, γ-octalactone, γ-nonalactone, γ-decalactone, γ-undecalactone, δ-valerolactone, δ-hexalactone, δ-heptalactone, δ-octalactone, δ-nonalactone, δ-decalactone, δ-undecalactone, and ε-caprolactone may be used either alone or as a mixture. A preferable form of the lactone solvent in the present invention is γ-lactones having five-membered ring structure, and a more preferable form is γ-butyrolactone, γ-valerolactone. The use of the lactones (ingredient e) enables a further improvement in the quality of printing on the vinyl chloride base material.

Regarding the dispersant (ingredient f), an arbitrary dispersant generally used for the oil-based ink composition for inkjet recording may be used. A dispersant acting effectively when the solubility parameter of the organic solvent is from 8 to 11 is preferably used. Examples of the dispersant comprise polyester polymers such as Hinoacto KF1-M, T-6000, T-7000, T-8000, T-8350P, T-8000EL (trade names, produced by Takefu Fine Chemical Corporation) and the like, solsperse 20000, 24000, 32000, 32500, 33500, 34000, 35200 (trade names, produced by The Lubrizol Corporation), disperbyk-161, 162, 163, 164, 166, 180, 190, 191, 192 (trade names, produced by BYK-Chemie GmbH), FLOWLEN DOPA-17, 22, 23, G-700 (trade names, produced by Kyoeisha Chemical Corporation), AJISPER-PB821, PB711 (trade names, produced by Ajinomoto-Fine-Techno Corporation), LP4010, LP4050, LP4055, POLYMER 400, 401, 402, 403, 450, 451, 453 (trade names, produced by EFKA chemicals B. V.), which may be used either alone or as a mixture.

The content ratio of the dispersant in the oil-based ink composition of the present invention is from 5% to 200% by weight, preferably from 30% to 120% by weight, relative to the content of the colorant (particularly pigment) in the ink composition. The content rate of the dispersant may be suitably selected according to the colorant to be dispersed.

A stabilizer such as an antioxidant and ultraviolet absorber, a surface-active agent, and/or the like may be added to the oil-based ink composition for inkjet recording of the present invention, when required. Preferable examples of antioxidants comprise BHA (2,3-dibutyl-4-oxyanisole), BHT (2,6-di-t-butyl-p-cresol), and the like. The content ratio of the antioxidant is preferably from 0.01% to 3.00% by weight in the oil-based ink composition. Examples of the ultraviolet absorber comprise benzophenone compounds and benzotriazole compounds. The content ratio of the ultraviolet absorber is preferably from 0.01% to 0.5% by weight in the oil-based ink composition. Regarding the surface-active agent, any surface-active agent of the anionic, cationic, amphoteric and nonionic types may be used.

The content ratio of the surface-active agent is preferably from 0.5% to 4.0% by weight in the oil-based ink composition. >Method for Producing the Oil-based Ink Composition for Inkjet Recording>

A method for producing a polymer composition according to the present invention comprises the process of blending the glycol ether dialkyl ethers (ingredient a) and the acrylic resin (ingredient b) resulting from solution polymerization in the solvent of the glycol ether dialkyl ethers by use of a radical polymerization initiator.

When an oil-based ink composition for inkjet recording according to the present invention comprises ingredients in addition to the ingredients a and b, for example, comprises the above-described ingredients c, d, e and f, these ingredients are mixed to produce the oil-based in composition.

An order of blending the ingredients and a method of blending may be selectively determined. For example, they can be determined in view of properties and forms of the preparations, and the convenience and facilitation of the producing process and the like in each step of the producing process. For example, the ingredients may be prepared independently of each other, or alternatively the supplying and the preparation of the ingredients may be collectively performed so that the preparations of the ingredients can be obtained all together. Still alternatively, two or three ingredients may be prepared in advance and then mixed with the other ingredients. In this case, when the two or three ingredients are prepared in advance, the amount of ingredients prepared may be the total amount of ingredients or a part of the required amount of ingredients.

In particular, in order to easily produce an oil-based ink composition for inkjet recording with desired dispersion of the pigment (ingredient c), it is preferable to mix together the pigment (ingredient c), the dispersant (ingredient f) and a part of the required amount of glycol ether dialkyl ethers (ingredient a) and then to mix the mixture with the remainder of the glycol ether dialkyl ethers (ingredient a) and the other ingredients. In this case, when the pigment (ingredient c), the dispersant (ingredient f) and a part of the required amount of glycol ether dialkyl ethers (ingredient a) are mixed, a ball mill, a bead mill, supersonic, a jet mill or the like is preferably used for the mixture to prepare a pigment dispersion. <Oil-Based Ink Composition for Inkjet Recording>

The oil-based ink composition of the present invention is preferably prepared to have a viscosity of 2 mPa·s to 10 mPa·s, preferably 3 mPa·s to 5 mPa·s at 20° C. The oil-based ink composition of the present invention is preferably prepared to have a surface tension from 20 mN/m to 50 mN/m. The surface tension less than 20 mN/m makes the ink composition spread over the surface of the printer head for the inkjet recording or to leak out of the printer head, which may possibly lead to difficult discharge of the ink drop. The surface tension exceeding 50 mN/m disturbs proper spread of the ink over the surface of the record medium, which may possibly lead to defective print.

The oil-based ink composition of the present invention has the advantage of being inert to the surface of the discharge nozzle subjected to the ink repellent treatment. Therefore, the oil-based ink composition of the present invention is capable of being advantageously used in an inkjet recording system of ejecting ink from the printer head for inkjet recording having a discharge nozzle subjected to the ink repellent treatment, for example.

The oil-based ink composition for inkjet recording of the present invention is capable of being used regardless of kinds/types of record mediums, but in order to effectively exert the effects of the present invention, a suitable record medium is of a plastic base material, particularly, a rigid or flexible polyvinyl chloride base material. Examples of the polyvinyl chloride base materials comprise films and sheets. The oil-based ink composition for inkjet recording of the present invention enables the printing on the non-treated surface of the polyvinyl chloride base material on which a conventional oil-based ink composition is incapable of printing. In consequence, the present invention advantageously eliminates the need for using expensive record media such as a conventional record medium having a receiving layer. It goes without saying that the oil-based ink composition for inkjet recording of the present invention has a desired printing property on a record medium having a surface treated with an ink receivable resin.

EXAMPLES

Examples of the present invention will be described below in detail, but the scope of the present invention is not limited by the examples.

The analysis was performed on the samples obtained by using hexane to purify only a resin from a resin solution.

Gel permeation chromatography (GPC) using polystyrene as the reference was carried out to measure the molecular weight by "HLC-8220GPC", produced by Tosoh Corporation.

Synthesis of Polymers

In the following, the analysis of prepared polymers 1 to 6 was performed on the samples obtained by using hexane to purify only a resin from a resin solution. The measurement of molecular weight was performed by GPS using polystyrene as the reference. The glass transition temperature (Tg) was measured by a differential scanning calorimeter "DSC-50", produced by Shimadzu Corporation.

Synthesis of Polymer 1

Drops of the mixture of 200 g of methyl methacrylate and 3.6 g of t-butyl peroxy-2-ethylhexanoate were added for 1.5 hours into 300 g of diethylene glycol diethyl ether which was kept at 100° C. After the completion of the addition, the mixture has cooled after reaction for 2 hours at 100° C., thus obtaining a transparent and colorless polymer solution of methyl methacrylate. Tg was 105° C.

The result of the GPC measurement was 30000 of weight average molecular weight of polymer 1.

The mass number of polymer 1 was measured by MALDI TOF-MS (the laser ionization time-of-flight mass spectrometer) (AXIMA-CFR plus, matrix; dilatinol, cationization agent; NaI, produced by Shimadzu Corporation). The measurement results are described below (FIG. 1).

Some detection peaks are described.

Mass number 1085, 1123, 1185, 1223, 1285, 1323 (these values express masses of polymers ionized by $Na^+$).

Peaks "1085, 1185, 1285" of these peaks are equal to the mass number of Na ion of the polymer having structure caused by the solvent at its terminal. The peaks "1123, 1223, 1323" are equal to the mass number of a compound in which the polymer having, at its terminal, structure caused by the radical polymerization initiator, t-butyl peroxy-2-ethylhexanoate is ionized by $Na^+$.

Synthesis of Polymer 2

By the same synthesis method as that by which polymer 1 is obtained, the mixture of 200 g of methyl methacrylate and 1.8 g of t-butyl peroxy-2-ethylhexanoate was used to obtain a transparent and colorless polymer solution of methyl methacrylate (Tg is 105° C., the molecular weight is 50000).

Synthesis of Polymer 3

By the same synthesis method as that by which polymer 1 is obtained, the mixture of 180 g of methyl methacrylate and 0.9 g of t-butyl peroxy-2-ethylhexanoate was used to obtain a transparent and colorless polymer solution of methyl methacrylate (Tg is 105° C., the molecular weight is 90000).

Synthesis of Polymer 4

By the same synthesis method as that by which polymer 1 is obtained, the mixture of 180 g of methyl methacrylate, 20 g of n-butyl methacrylate and 3.6 g of t-butyl peroxy-2-ethylhexanoate was used to obtain a transparent and colorless copolymer solution of methyl methacrylate and n-butyl methacrylate (Tg is 94° C., the molecular weight is 30000).

Synthesis of Polymer 5

By the same synthesis method as that by which polymer 1 is obtained, the mixture of 180 g of methyl methacrylate, 20 g of 2-ethoxyethyl methacrylate and 3.6 g of t-butyl peroxy-2-ethylhexanoate was used to obtain a transparent and colorless copolymer solution of methyl methacrylate and 2-ethoxyethyl methacrylate (Tg is 85° C., the molecular weight is 30000).

Synthesis of Polymer 6

By the same synthesis method as that by which polymer 1 is obtained, the mixture of 180 g of methyl methacrylate, 20 g of benzyl methacrylate and 3.6 g of t-butyl peroxy-2-ethylhexanoate was used to obtain a transparent and colorless copolymer solution of methyl methacrylate and benzyl methacrylate (Tg is 91° C., the molecular weight is 30000).

Synthesis of Polymer 7

A transparent and colorless polymer solution of methyl methacrylate (Tg is 105° C., the molecular weight is 30000) was obtained by the same synthesis method as that by which polymer 1 is obtained but by using toluene for the solvent.

Examples

"Pigment Red 122" was used as a colorant in Examples and comparative examples described below.

"Solsperse 32000" (polyester compound), produced by The Lubrizol Corporation, was used as a dispersant. The resin of the present invention was used as a binder resin (acrylic resin).

The viscosity was measured by use of "AMVn" viscosimeter, produced by Anton Paar Corporation. The particle diameter of a pigment particle was measured by "microtrac UPA150" produced by NIKKISO Corporation.

Example 1

A solvent of the following composition was used.

Diethylene glycol diethyl ether
    41.5 part by weight
Tetraethylene glycol dimethyl ether
    25.0 part by weight
γ-butyrolactone 25.0 part by weight 3.0 part by weight of the colorant and 1.5 part by weight of the dispersant were added to a part of the solvent of the above composition, which was then agitated for one hour at 3000 rpm by use of a dissolver, which was then preliminarily dispersed by a bead mill filled with zirconia beads (2 mm). The average particle diameter of the obtained pigment particles was 5 μm or less.

After that, the regular dispersion was performed by a nanomill filled with zirconia beads (0.3 mm) to obtain pigment dispersions. The average particle diameter of the pigment particles after the regular dispersion was 150 nμm. While the obtained pigment dispersion was agitated at 400 rpm, 4.0 part of weight of polymer 1 serving as a binder resin and the remainder of the mixture solvent prepared above were added to the pigment dispersion to prepare an ink composition V1 for inkjet recording of the present invention (viscosity: 4.0 mPa·s (20° C.)).

Example 2

An ink composition V2 for inkjet recording of the present invention (viscosity: 4.2 mPa·s (20° C.)) was prepared by use of polymer 2 instead of polymer 1 in Example 1 and by the same method as that in Example 1.

Example 3

An ink composition V3 for inkjet recording of the present invention (viscosity: 4.5 mPa·s (20° C.)) was prepared by use of polymer 3 instead of polymer 1 in Example 1 and by the same method as that in Example 1.

Example 4

An ink composition V4 for inkjet recording of the present invention (viscosity: 3.8 mPa·s (20° C.)) was prepared by use of polymer 4 instead of polymer 1 in Example 1 and by the same method as that in Example 1.

Example 5

An ink composition V5 for inkjet recording of the present invention (viscosity: 3.8 mPa·s (20° C.)) was prepared by use of polymer 5 instead of polymer 1 in Example 1 and by the same method as that in Example 1.

Example 6

An ink composition V6 for inkjet recording of the present invention (viscosity: 3.8 mPa·s (20° C.)) was prepared by use of polymer 6 instead of polymer 1 in Example 1 and by the same method as that in Example 1.

Comparative Example 1

An ink composition Y1 for inkjet recording (viscosity: 4.1 mPa·s (20° C.)) was prepared by use of polymer 7 instead of polymer 1 in Example 1 and by the same method as that in Example 1.

Comparative Example 2

An ink composition Y2 for inkjet recording (viscosity: 4.3 mPa·s (20° C.)) was prepared by use of "Dianar BR83", produced by Mitsubishi Rayon Corporation, instead of polymer 1 in Example 1 and by the same method as that in Example 1.

Comparative Example 3

An ink composition Y3 for inkjet recording (viscosity: 3.8 mPa·s (20° C.)) was prepared by use of "Paraloyd B60", produced by Rohm & Haas Corporation, instead of polymer 1 in Example 1 and by the same method as that in Example 1.

Comparative Example 4

An ink composition Y4 for inkjet recording (viscosity: 3.7 mPa·s (20° C.)) was prepared by use of "Paraloyd B99N", produced by Rohm & Haas Corporation, instead of polymer 1 in Example 1 and by the same method as that in Example 1.

<Evaluation of Ink Composition for Inkjet Recording>

Ink compositions V1 to V6 obtained in the above examples and ink compositions Y1 to Y4 obtained in the above comparative examples were evaluated by the following evaluation method.

Table 1 shows the evaluation results.

Coloring Properties

An inkjet printer "MJ-8000C" produced by SEIKO EPSON Corporation was used to print solid fill on a vinyl chloride film "JT5829R" produced by MACtac Corporation, and the print density was measured by a reflection densitometer.

Evaluation A: OD value≧1.6
Evaluation B: OD value<1.6
Evaluation C: the printed area is white Drying Properties The time until the ink is dried after printing solid fill was measured.

Evaluation A: less than one minute
Evaluation B: less than three minutes
Evaluation C: more than three minutes Re-Solubility The ink composition was placed on a Petri dish and stood for one hour at 60° C., and then drops of ink were applied to the dried and set ink. The re-solubility (dispersion) was checked.

Evaluation A: the ink was quickly dissolved again (less than 5 minutes).
Evaluation B: the ink was dissolved again but time is required (more than 5 minutes).
Evaluation C: portion of the ink was not dissolved.

Rubfastness

The printed surface on which the ink is printed with solid fill was visually observed after JIS-L0849 abrasion machine I had been reciprocated 100 times on the printed surface.

Evaluation A: the degradation occurred rarely on the printed surface.
Evaluation B: slight degradation occurred on the printed surface, but the designing was not impaired.
Evaluation C: the density was decreased and the degradation occurred.

Print Stability

The printing was performed continuously in room temperature and the presence/absence of dot omission, directional failure of ink flight, and ink scattering were observed.

Evaluation A: less than 10 occurrences of dot omission, directional failure of ink flight, and ink scattering over the period of time during the continuous 48-hour test.
Evaluation B: from 10 to less than 20 occurrences of dot omission, directional failure of ink flight, and ink scattering over the period of time during the continuous 48-hour test.
Evaluation C: 20 occurrences or more of dot omission, directional failure of ink flight, and ink scattering over the period of time during the continuous 48-hour test.

TABLE 1

| Example | Coloring | Drying | Re-solubility | Rub-fastness | Print stability |
|---|---|---|---|---|---|
| Example 1 (V1) | A | A | A | A | A |
| Example 2 (V2) | B | A | A | A | A |
| Example 3 (V3) | B | A | A | A | B |
| Example 4 (V4) | A | A | A | B | A |
| Example 5 (V5) | A | A | A | A | A |
| Example 6 (V6) | A | A | A | A | A |
| Comparative Example 1 (Y1) | B | A | B | A | C |
| Comparative Example 2 (Y2) | C | A | C | A | C |
| Comparative Example 3 (Y3) | A | C | C | C | B |
| Comparative Example 4 (Y4) | A | B | B | C | A |

From Table 1, the oil-based ink composition for inkjet recording of the present invention is excellent in the all evaluation items. On the other hand, comparative examples 1 and 2 are inferior in the coloring properties, re-solubility and the pint stability and comparative examples 3 and 4 are inferior in the drying properties, re-solubility and rubfastness.

It is verified from the above results that the ink of the present invention is far superior in the re-solubility to conventional resins typically used, and also has optimum printing properties such as the coloring properties and the drying properties.

INDUSTRIAL APPLICABILITY

The present invention enables the use of a resin having a high TG such as methacrylate homopolymer which is not conventionally used easily because it is inferior in solubility although it is of glycol ether dialkyl ethers having high safety because of a high boiling point, a low vapor pressure and a low odor and outstanding at the working atmosphere.

According to the present invention, it is possible to effectively use the resin as an oil-based ink composition for inkjet recording which is suitable for printing on a polyvinyl chloride base material and excellent in the coloring properties, print stability, printing drying properties, rubfastness and re-solubility.

What is claimed is:

1. A composition comprising:
   a glycol ether dialkyl ether as a prime solvent; and
   a first reaction product having a structure in which a glycol ether dialkyl ether is bonded to a terminal of an acrylic resin,
   wherein the first reaction product results from solution polymerization of a free radical polymerizable acrylic monomer in a solvent of the glycol ether dialkyl ether by use of a radical polymerization initiator, and
   wherein the composition is an oil-based inkjet ink composition.

2. The composition according to claim 1, wherein:
   the glycol ether dialkyl ether is selected from the group consisting of polyoxyethylene glycol dimethyl ether, polyoxyethylene glycol diethyl ether, and polyoxyethylene glycol ethyl methyl ether, expressed by a general formula (1) described below, $$R^1—(OC_2H_4)_n—OR^2 \quad (1)$$

where $R^1$ and $R^2$ denote independently a methyl group or ethyl group and n denotes an integral number from 2 to 4.

3. The composition according to claim 1, wherein:
   the free radical polymerizable monomer is selected from the group consisting of a vinyl aromatic compound, alkyl methacrylate ester, aralkyl methacrylate ester, alkoxyalkyl methacrylate ester, hydroxyalkyl methacrylate ester, methacrylic acid, and dialkylaminoalkyl methacrylate ester.

4. The composition according to claim 1, wherein:
   the acrylic resin is either a polymer of methacrylate methyl ester or a copolymer comprising 100 part by weight of methacrylate methyl ester and 0.01 to 15 part by weight of one selected from the group consisting of methacrylate butyl ester, methacrylate ethoxyethyl ester and methacrylate benzyl ester.

5. The composition according to claim 1, wherein:
   the acrylic resin has a glass transition temperature of 80° C. or more.

6. The composition according to claim 1, wherein:
   the acrylic resin has a weight average molecular weight of 10,000 to 100,000.

7. The composition according to claim 1, further comprising:
   a colorant.

8. The composition according to claim 1, further comprising:
   a resin ingredient comprising at least one of vinyl chloride copolymer resins and cellulose resins.

9. The composition according to claim 1, further comprising:
   lactones.

10. The composition according to claim 1, further comprising:
    a dispersant.

11. The composition according to claim 1, wherein:
    the radical polymerization initiator is selected from the group consisting of organic peroxides of a hydroperoxide type, a dialkylperoxide type, a peroxyester type, a diacylperoxide type, a peroxycarbonate type, a peroxyketal type, a ketoneperoxisde type and combinations thereof.

12. The composition according to claim 1, further comprising:
    a second reaction product having a structure in which the radical polymerization initiator is bonded to a terminal of an acrylic resin,
    wherein the second reaction product results from the solution polymerization of the free radical polymerizable monomer in the solvent of the glycol ether dialkyl ether by use of the radical polymerization initiator.

13. A method of producing a composition comprising:
    providing a glycol ether dialkyl ether;
    providing a first reaction product having a structure in which a glycol ether dialkyl ether is bonded to a terminal of an acrylic resin, wherein the first reaction product results from solution polymerization of a free radical polymerizable acrylic monomer in a solvent of the glycol ether dialkyl ether by use of a radical polymerization initiator, and
    blending the glycol ether dialkyl ether and the first reaction product,
    wherein the composition is an oil-based inkjet ink composition.

14. The method according to claim 13, wherein:
the composition further comprises a second reaction product having a structure in which the radical polymerization initiator is bonded to a terminal of an acrylic resin, wherein the second reaction product results from the solution polymerization of the free radical polymerizable monomer in the solvent of the glycol ether dialkyl ether by use of the radical polymerization initiator.

* * * * *